(12) United States Patent
Shurie

(10) Patent No.: US 11,975,834 B2
(45) Date of Patent: May 7, 2024

(54) HIGH-RISE BUILDING ESCAPE DRONE

(71) Applicant: Jaffer Shurie, Silver Spring, MD (US)

(72) Inventor: Jaffer Shurie, Silver Spring, MD (US)

( * ) Notice: Subject to any disclaimer, the term of this patent is extended or adjusted under 35 U.S.C. 154(b) by 149 days.

(21) Appl. No.: 17/152,881

(22) Filed: Jan. 20, 2021

(65) Prior Publication Data
US 2021/0221504 A1 Jul. 22, 2021

Related U.S. Application Data

(60) Provisional application No. 62/965,514, filed on Jan. 24, 2020, provisional application No. 62/963,404, filed on Jan. 20, 2020.

(51) Int. Cl.
| | |
|---|---|
| B64C 39/02 | (2023.01) |
| A62B 1/00 | (2006.01) |
| A62B 1/02 | (2006.01) |
| B64C 25/58 | (2006.01) |
| B64D 11/06 | (2006.01) |
| B64D 25/18 | (2006.01) |
| B64D 27/24 | (2006.01) |
| B64U 10/13 | (2023.01) |

(Continued)

(52) U.S. Cl.
CPC ........... *B64C 39/024* (2013.01); *A62B 1/00* (2013.01); *A62B 1/02* (2013.01); *B64C 25/58* (2013.01); *B64D 11/062* (2014.12); *B64D 25/18* (2013.01); *B64D 27/24* (2013.01); *B64U 10/13* (2023.01); *B64U 30/20* (2023.01); *B64U 50/19* (2023.01); *B64U 2101/00* (2023.01); *B64U 2101/60* (2023.01); *B64U 2201/10* (2023.01)

(58) Field of Classification Search
CPC ..... B64C 27/04; B64C 27/06; B64C 29/0016; B64C 29/0025; B64C 39/026; B64C 2201/024; B64C 2201/12; B64C 2201/128; B64C 2201/027; B64C 2201/108; B64U 2101/55; B64U 2101/60; A62B 1/00
See application file for complete search history.

(56) References Cited

U.S. PATENT DOCUMENTS 2,180,922 A * 11/1939 De Bothezat ......... B64C 39/026
  416/129
2,461,348 A *  2/1949 Pentecost ............. B64C 39/026
  416/129

(Continued)

FOREIGN PATENT DOCUMENTS

CN 108190033 A * 6/2018
CN 109050939 A * 12/2018

(Continued)

*Primary Examiner* — Christopher D Hutchens
*Assistant Examiner* — Michael A. Fabula
(74) *Attorney, Agent, or Firm* — Boudwin Intellectual Property Law, LLC; Daniel Boudwin

(57) ABSTRACT

A high rise building escape drone is shown and described. The high rise building escape drone includes of a frame. The frame has a spine secured to an upper housing. The upper housing secures a motor and a CPU operably connected to the motor. The motor is rotatably coupled to at least one propeller. A seat is secured to the spine below the upper housing. A control panel is secured to the seat. The control panel is operably coupled to the CPU and is capable to control the drone. A plurality of feet are secured to a bottom of the spine such that the feet support the drone.

1 Claim, 4 Drawing Sheets

(51) Int. Cl.
*B64U 30/20* (2023.01)
*B64U 50/19* (2023.01)
*B64U 101/00* (2023.01)
*B64U 101/60* (2023.01)

(56) References Cited

U.S. PATENT DOCUMENTS

| | | | | |
|---|---|---|---|---|
| 2,486,059 | A * | 10/1949 | Pentecost | B64C 39/026 244/17.11 |
| 2,978,206 | A * | 4/1961 | Johnson | B64C 29/0016 244/23 C |
| 3,029,047 | A * | 4/1962 | Jacobsen | B64C 1/063 244/17.11 |
| 3,127,131 | A * | 3/1964 | Sudrow | B64C 29/0016 244/50 |
| 3,272,457 | A * | 9/1966 | MacMillan | B64C 39/026 244/3 |
| 3,276,723 | A * | 10/1966 | Miller | B64C 29/0025 244/23 C |
| 3,586,263 | A * | 6/1971 | Payne | B64C 27/50 244/4 A |
| 4,071,206 | A * | 1/1978 | Magill | B64C 39/026 244/17.11 |
| 4,473,199 | A * | 9/1984 | Magill | B64C 27/06 244/17.11 |
| 10,532,815 | B1 * | 1/2020 | Thrun | H01M 50/249 |
| 10,604,241 | B1 * | 3/2020 | Dong | B64C 27/82 |
| 10,703,480 | B1 * | 7/2020 | Thrun | B64D 11/06 |
| 11,820,505 | B2 * | 11/2023 | Shurie | B64D 25/18 |
| 2012/0298790 | A1 * | 11/2012 | Bitar | B64D 27/24 244/17.11 |
| 2014/0048657 | A1 * | 2/2014 | Lin | B64C 29/0025 244/23 A |
| 2017/0197710 | A1 * | 7/2017 | Ma | G08G 5/0026 |
| 2018/0194469 | A1 * | 7/2018 | Evans | B64C 39/024 |
| 2018/0237086 | A1 * | 8/2018 | Evans | B62D 47/006 |
| 2018/0312257 | A1 * | 11/2018 | Near | B64C 1/061 |
| 2018/0334244 | A1 * | 11/2018 | Cherepinsky | B64C 13/18 |
| 2020/0026309 | A1 * | 1/2020 | Ma | B64D 47/08 |
| 2020/0130822 | A1 * | 4/2020 | Dong | B64C 27/025 |
| 2021/0001983 | A1 * | 1/2021 | Fredsted | B64C 27/08 |
| 2021/0221522 | A1 * | 7/2021 | Shurie | B64C 39/024 |
| 2021/0300594 | A1 * | 9/2021 | Thrun | B60L 53/16 |

FOREIGN PATENT DOCUMENTS

| | | | | |
|---|---|---|---|---|
| EP | 3760538 | A1 * | 1/2021 | B64C 27/08 |
| WO | WO-0035751 | A1 * | 6/2000 | B64C 39/026 |
| WO | WO-0247978 | A2 * | 6/2002 | B64C 39/026 |

* cited by examiner

HIGH-RISE BUILDING ESCAPE DRONE

CROSS REFERENCE TO RELATED APPLICATIONS

This application claims the benefit of U.S. Provisional Application No. 62/965,514 filed on Jan. 24, 2020 and U.S. Provisional Application No. 62/963,404 filed on Jan. 20, 2020. The above identified patent application is herein incorporated by reference in its entirety to provide continuity of disclosure.

BACKGROUND OF THE INVENTION

The present invention relates to an emergency escape drone. More particularly, the present invention provides a manned drone capable of safely flying at least one person from a high rise building.

Currently, high rise buildings have several emergency escape methods. These methods include using stair to exit the building. Stairs while functional have several drawbacks. First, it can be time consuming to exit using stairs. Not only does it take time to talk down stairs safely, but this creates a bottle neck in large buildings elongating the process further. Stairs also may be difficult for various individuals to navigate. This means that these individuals will require help to exit the building. In some cases, stairs prevent all parties from safely escaping in a timely manner.

In other instances, high rise buildings have specially designed elevators to help individuals escape in an emergency. In most cases it is unsafe to exit a building via an elevator. Elevators may cease operation if there is a power shortage causing individuals to become trapped. This would make the situation even more dangerous.

Consequently, there is a need for an improvement in the art of high rise safety. The present invention substantially diverges in design elements from the known art while at the same time solves a problem many people face when there is an emergency in a high rise building that requires an escape. In this regard the present invention substantially fulfills these needs.

SUMMARY OF THE INVENTION

The present invention provides a high rise building escape drone wherein the same can be utilized for providing convenience for the user when using a high rise building escape drone. The high rise building escape drone comprises a frame. The frame has a spine secured to an upper housing. The upper housing secures a motor and a CPU operably connected to the motor. The motor is rotatably coupled to at least one propeller. A seat is secured to the spine below the upper housing. A control panel is secured to the seat. The control panel is operably coupled to the CPU and is capable to control the drone. A plurality of feet are secured to a bottom of the spine such that the feet support the drone.

Another object of the high rise building escape drone is to provide a CPU which contains an autopilot capable of navigating the drone to the ground.

Another object of the high rise building escape drone is to provide an altimeter located in the upper housing operably coupled to the CPU.

Another object of the high rise building escape drone is to provide at least one additional seat secured to the spine below the upper housing.

Another object of the high rise building escape drone is to provide a safety grate located about the underside of the propeller.

Another object of the high rise building escape drone is to provide a power source located within the upper housing.

Another object of the high rise building escape drone is to provide a plurality of feet that are shock absorbing feet.

Another object of the high rise building escape drone is to provide a safety strap system for the seat.

Another object of the high rise building escape drone is to provide a control panel which has a selector for selecting manual control or autopilot.

Another object of the high rise building escape drone is to provide a platform perpendicularly connected to the spine below the seat but above the plurality of feet.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
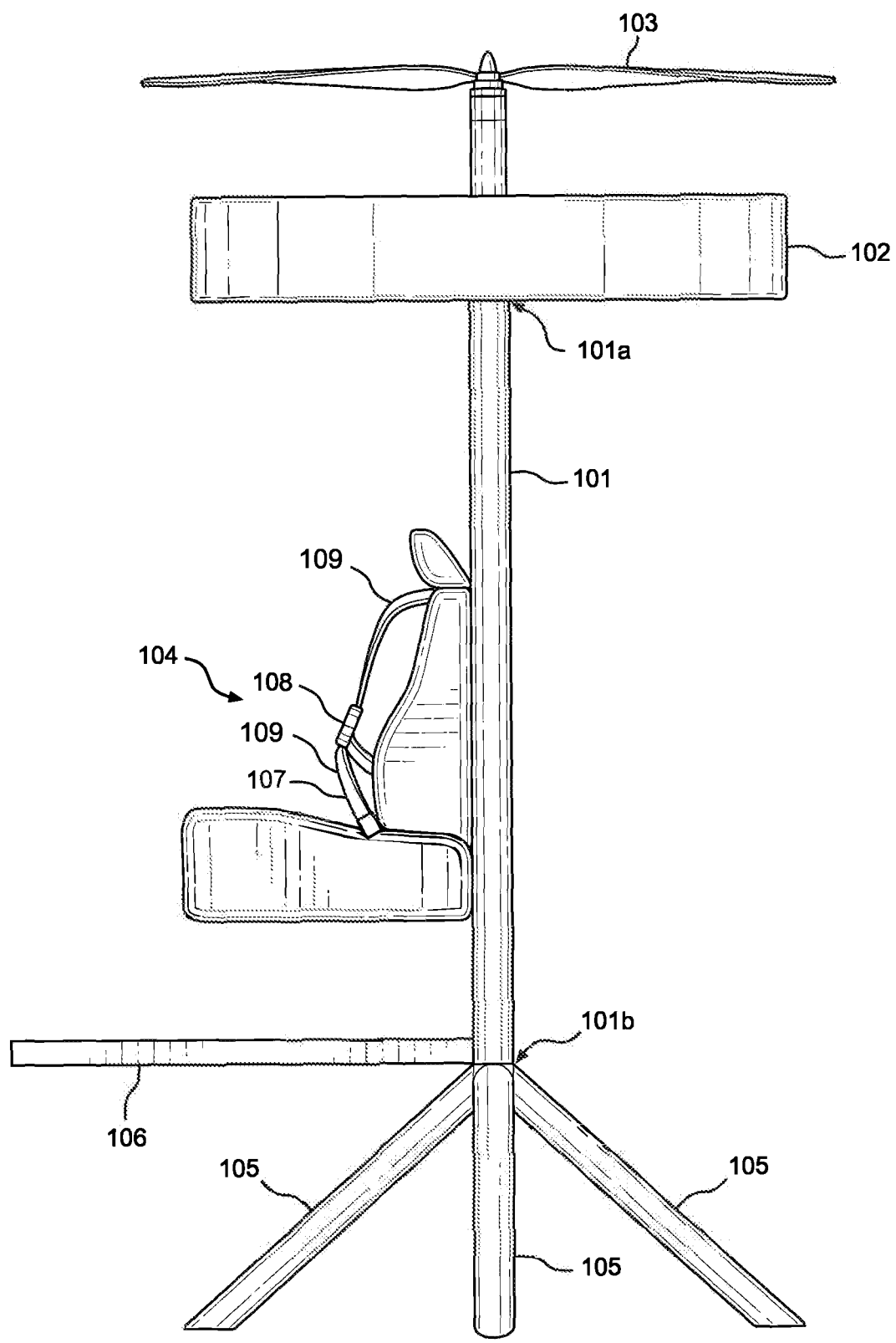
FIG. 1 shows a perspective view of an embodiment of the high rise building escape drone.

Reference is made herein to the attached drawings. Like reference numerals are used throughout the drawings to depict like or similar elements of the high rise building escape drown. For the purposes of presenting a brief and clear description of the present invention, a preferred embodiment will be discussed as used for the high rise building escape drone. The figures are intended for representative purposes only and should not be considered to be limiting in any respect.

Referring now to FIG. 1, there is shown a perspective view of an embodiment of the high rise building escape drone. The high rise building escape drone includes a frame. The frame is comprised of a spine 101. In one embodiment, the spine 101 is made from tubing. This will ensure a strong spine 101 while still keeping weight at a minimum. In another embodiment the spine 101 is made from aluminum to reduce weight. The spine 101 defines a rigid member for which the other parts of the drone are attached.

Attached to a top end of the spine 101a is a housing 102. The housing 102 has an interior volume that will hold several components as described below. The housing 102 includes a bottom side and a plurality of sidewalls rising therefrom. In one embodiment, the housing 102 has a solid base and sidewalls. In another embodiment, the housing 102 has a plurality of apertures therethrough. This will create a secure housing while reducing weight.

The drone has at least one propeller 103 rotatably coupled above the housing 102. The at least one propeller 103 will be rotatably coupled to a motor as described below. The at least one propeller 103 will provide lift to the high rise escape drone. In another embodiment, the propeller is further configured to provide control directional control to the high rise escape drone.

The high rise escape drone has a seat 104 secured to the spine 101. The seat 104 will be located between the housing 102, secure to the top of the spine 101 and a lower end of the spine 101b. The seat 104 will allow for an individual to sit within the seat 104 and be transported by the drone. In one embodiment, the seat 104 is made from plastic. In one embodiment, the seat 104 has padding located therein.

In various embodiments, the seat 104 has a seat belt system. In one embodiment, the seat belt system includes a waist strap 107. In one embodiment, there is a buckle 108 connected to one portion of the waist strap 107. The other part of the waist strap 107 is configured to be removably secured to the buckle 108. In another embodiment, the seat belt system further includes a pair of shoulder straps 109. The shoulder straps 109 are secured to the seat back at one end and are configured to be removably secured to the buckle 108 at a second end.

In one embodiment, there is a platform 106 secured to the spine 101. The platform 106 will allow an individual to rest his feet thereon when he is in the seat. In one embodiment, the platform 106 is perpendicularly secured to the spine 101. The platform is secured to the spine 101 in a position between the bottom of the seat 104 and the lower end of the spine 101b. In one embodiment, the platform 106 is hingedly secured to the spine 101. This will allow the platform to fold into a storage position.

The spine 101 has a plurality of legs 105 secured to the lower end of the spine 101b. In one embodiment, the plurality of legs 105 form a tripod structure. This will ensure that the drone stays upright when positioned on the legs. In one embodiment, the plurality of legs 105 are in fixed positions. In another embodiment, the plurality of legs 105 are rotatably fixed to the spine 101 such that they will be able to rotate together. This will allow for collapsing of the drone for storage.

Figure 2:
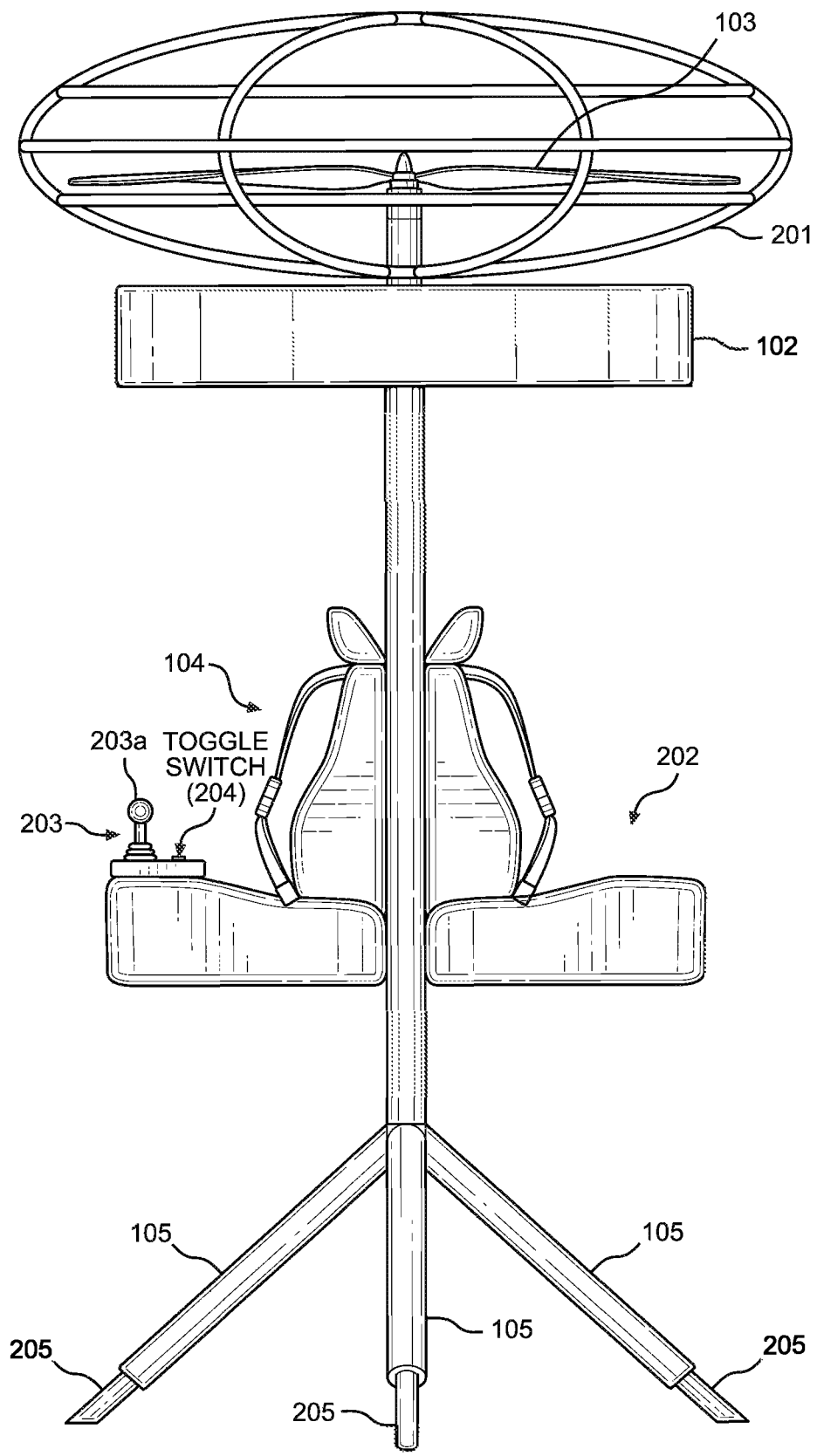
FIG. 2 shows a perspective view of an embodiment of the high rise building escape drone.

Referring now to FIG. 2, there is shown a perspective view of an embodiment of the high rise building escape drone. In one embodiment, the high rise building escape drone includes a safety grate 201. The safety grate will protect an individual from getting hit by the at least one propeller 103 while at the same time allowing for air to properly pass therethrough. In one embodiment, the safety grate 201 is attached above the housing 102. In another embodiment, the safety grate 201 is attached below the housing 102.

In one embodiment, the high rise escape drone includes at least a second seat 202. In further embodiments, more seats are secured to the drone. In the shown embodiment, the second seat 202 is secured to the spine 101 opposite the original seat 104. This will allow for the weight to be balanced as the drone flies. In one embodiment, the second seat has a seat belt system secured thereto.

In some embodiments, the high rise escape drone includes a control panel 203 secured to the seat 104. The control panel 203 is operably coupled to the motor and the CPU, as described in FIG. 4. In one embodiment, the control panel includes a joy stick 203a. The joy stick 203a will allow a user to control the drone. In another embodiment, the control panel will include a toggle switch 204. The toggle switch will allow a user to select between manual flight and an autopilot flight. In one embodiment, the autopilot will be configured to land the drone safely on the ground.

In some embodiments, the high rise building escape drone includes shocks 205 as a part of the plurality of feet 105. In one embodiment, the shocks 205 are spring biased shocks. In another embodiment, the shocks 205 are air shocks. The shocks 205 will create a softer landing for the drone. In one embodiment, the shocks 205 are located within the plurality of legs 105. This will create a shock 105 while at the same time saving space.

Figure 3:
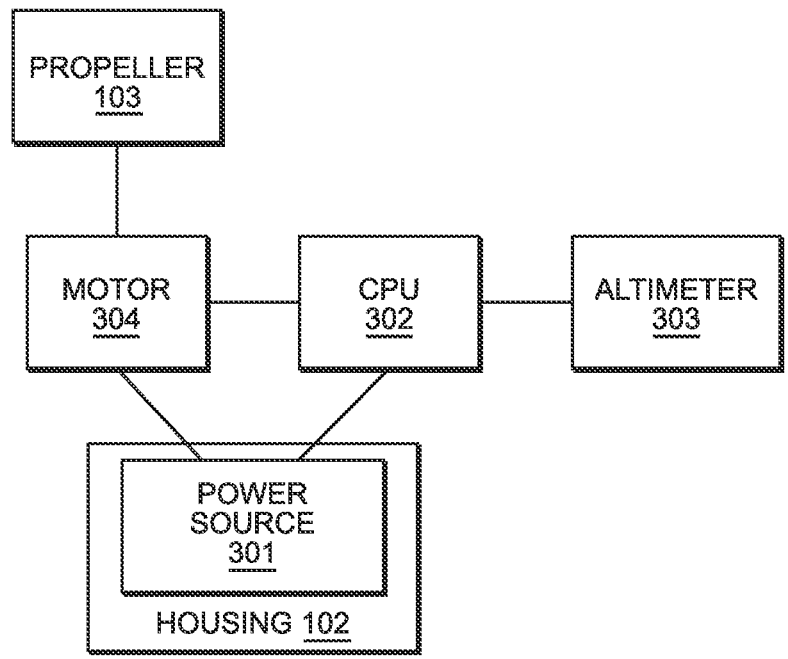
FIG. 3 shows a wiring diagram of an embodiment of the high rise building escape drone

Referring now to FIG. 3, there is shown a wiring diagram of an embodiment of the high rise building escape drone. The high rise building escape drone includes a power source 301 housed inside housing 102 as shown in FIGS. 1 and 2. In one embodiment, the power source 301 is a battery. The power source 301 is electrically coupled to a CPU 302. The CPU 302 controls various functions of the drone. In one embodiment, the CPU 302 will control the autopilot feature to safely land the drone. The CPU 302 is electrically coupled to an altimeter 303. The altimeter 303 will allow the CPU 302 to determine how far the drone is from the ground and control it accordingly.

The CPU 302 is electrically coupled to a motor 304. This will allow the CPU 302 to control the motor 304. The motor 304 is rotatably coupled to the at least one propeller 103. The motor 304 will control the speed at which the propeller 103 is rotated and thus the amount of lift given the drone. In one embodiment, the motor 304 is an electric motor. In another embodiment, the motor 304 is a petrol motor.

Figure 4:
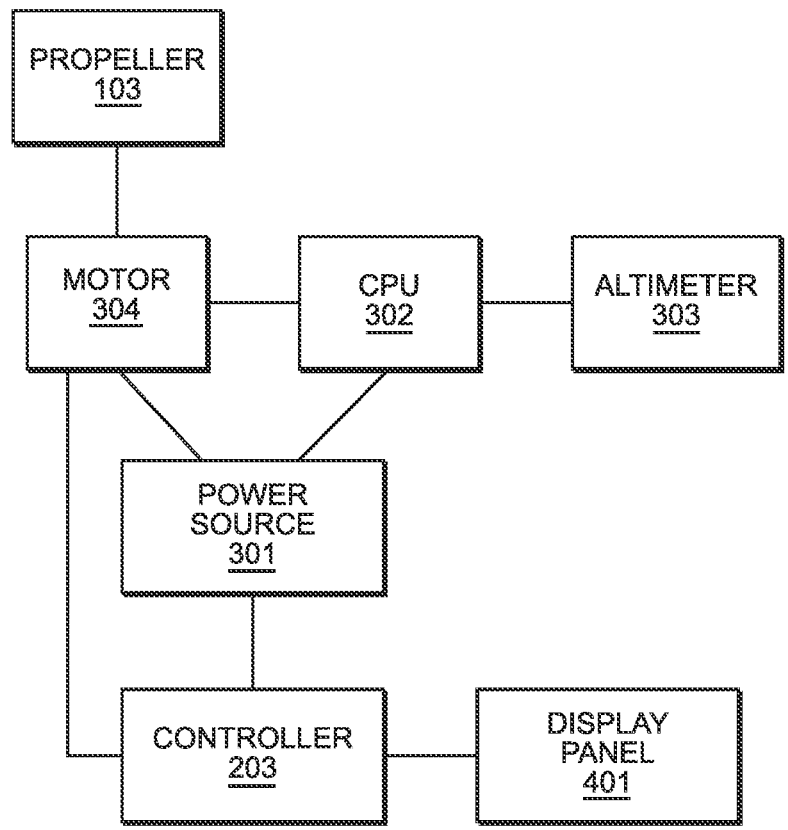
FIG. 4 shows a wiring diagram of an embodiment of the high rise building escape drone.

Referring now to FIG. 4, there is shown a wiring diagram of an embodiment of the high rise building escape drone. In some embodiments, there is a control panel 203 electrically coupled to the power source 301. The control panel 203 is further coupled to the CPU 302. This will allow the control panel 203 to be used to control the drone.

In one embodiment, the control panel 203 will have a display panel 401 thereon. In one embodiment, the display panel 401 will show the altitude of the drone. In yet a further embodiment, the display panel 401 will display the charge of the power source 301. In another embodiment, the display panel 401 will display the petrol level of the motor 304.

Figure 5:
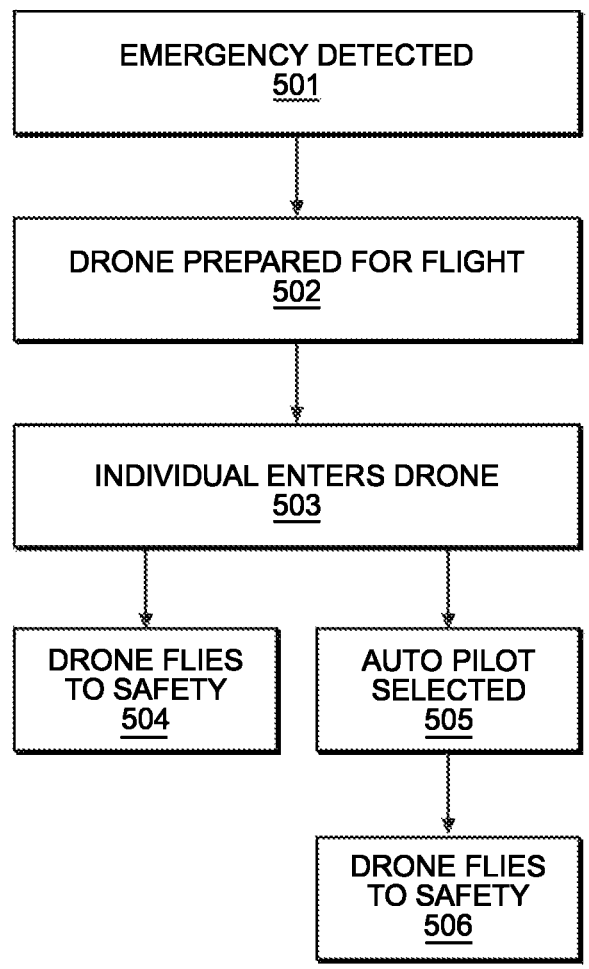
FIG. 5 shows a flow chart of an embodiment of a method for using the high rise building escape drone.

Referring now to FIG. 5, there is shown a flow chart of an embodiment of a method for using the high rise building escape drone. In use, the drone will be needed when an emergency is detected 501. In different embodiments, the emergency may be any number of issues that would cause the need to evacuate a high rise building. Once an emergency is detected, the drone is then prepared for flight 502. In some embodiments, this requires some assembly of the drone.

Once assembled, an individual will enter the drone 503. The individual will activate the drone and prepare to be flown to safety. In one embodiment, the individual will fly the drone to safety 504. In another embodiment, the user will select the autopilot feature 505. The drone will then fly the individual to safety 506.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:
1. A high rise building escape drone, consisting of:
a frame having a spine and an upper housing;
the upper housing securing a motor and a CPU operably connected to the motor;
the motor rotatably coupled to at least one propeller;
further comprising a safety grate located about the underside of the at least one propeller;
a power source located within the upper housing;
a seat secured to the spine below the upper housing;
wherein at least one additional seat is secured to the spine below the upper housing;
wherein the seat and the at least one additional seat each include a safety strap system;
a plurality of feet secured to a bottom of the spine;
wherein a platform is perpendicularly connected to the spine below the seat but above the plurality of feet;
wherein the plurality of feet are shock absorbing feet;
a control panel secured to the seat, wherein the control panel is operably coupled to the CPU such that the control panel operates the drone;
wherein the CPU contains autopilot to navigate the drone to the ground; and
wherein the control panel has a selector for selecting manual control or autopilot.

* * * * *